(12) United States Patent
Hermansen et al.

(10) Patent No.: US 6,723,803 B1
(45) Date of Patent: Apr. 20, 2004

(54) ADHESIVE OF FLEXIBLE EPOXY RESIN AND LATENT DIHYDRAZIDE

(75) Inventors: Ralph D. Hermansen, Northridge, CA (US); Steven E. Lau, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 1,929 days.

(21) Appl. No.: 08/700,133

(22) Filed: Aug. 20, 1996

Related U.S. Application Data

(63) Continuation-in-part of application No. 08/504,105, filed on Jul. 19, 1995, now abandoned.

(51) Int. Cl.⁷ .......................... C08G 59/40; C08L 63/00
(52) U.S. Cl. .......................... 525/533; 525/65; 525/113; 525/119; 525/423; 525/438; 525/481; 525/486; 525/524
(58) Field of Search .......................... 528/93, 119, 123; 525/481, 486, 533, 65, 113, 423, 438, 524

(56) References Cited

U.S. PATENT DOCUMENTS

| | | | | |
|---|---|---|---|---|
| 2,847,395 A | * | 8/1958 | Wear et al. | 260/47 |
| 3,087,910 A | * | 4/1963 | Wear et al. | 260/47 |
| 4,268,656 A | * | 5/1981 | Ray-Chaudhuri et al. | 528/103 |
| 4,360,649 A | * | 11/1982 | Kamio et al. | 525/484 |
| 4,530,991 A | * | 7/1985 | Hirai et al. | 525/504 |
| 4,585,698 A | * | 4/1986 | Anzai et al. | 428/413 |
| 4,701,378 A | * | 10/1987 | Bagga et al. | 525/486 |
| 4,713,432 A | * | 12/1987 | Bagga et al. | 526/313 |
| 4,714,648 A | | 12/1987 | Nagata | |
| 4,734,332 A | * | 3/1988 | Bagga et al. | 428/414 |
| 4,866,108 A | | 9/1989 | Vachon et al. | |
| 4,933,392 A | * | 6/1990 | Andrews et al. | 525/486 |
| 4,977,214 A | * | 12/1990 | Bagga | 525/484 |
| 5,017,674 A | * | 5/1991 | Tada et al. | 528/93 |
| 5,201,248 A | * | 4/1993 | Ibe et al. | 528/111 |

FOREIGN PATENT DOCUMENTS

| | | |
|---|---|---|
| EP | 0351365 | 1/1990 |
| EP | 0459614 | 12/1991 |
| EP | 0561048 | 9/1993 |

OTHER PUBLICATIONS

Lee et al. , Handbook of Epoxy Resins, McGraw Hill 1982 Reissue, pp. 2–16 through 2–18.*

* cited by examiner

*Primary Examiner*—Robert E. Sellers, II
(74) *Attorney, Agent, or Firm*—Colin Raufer; Glenn H. Lenzen, Jr.

(57) ABSTRACT

Flexible epoxy-based adhesive compositions which remain Theologically stable at room temperature in an uncured state comprise: (a) at least one flexible polyepoxide resin having a hardness not exceeding a durometer Shore D reading of 45 when cured with a stoichiometric amount of diethylene triamine ("DETA"); and (b) a substantially stoichiometric amount of at least one latent epoxy resin curing agent. Optionally, the adhesive composition may also incorporate one or more semi-flexible resins. Other optional components include fillers, thixotropic agents, and flexibilizers. The adhesive composition provicdes an epoxy-based adhesive composition that is storable for weeks as a single component mixture at room temperature, curable at temperatures ranging from about 100° C. to 125° C. in less than two hours, and flexible upon curing to temperatures as low as minus 50° C., exhibiting a durometer Shore A of less than about 95.

2 Claims, No Drawings

ADHESIVE OF FLEXIBLE EPOXY RESIN AND LATENT DIHYDRAZIDE

This is a continuation application Ser. No. 08/504,105 filed Jul. 19, 1995, abandoned.

CROSS-REFERENCE TO RELATED APPLICATIONS

The present application is related to applications having Ser. Nos. 08/504,002 and 08/504,168, both filed on even date herewith and entitled "Room-Temperature Stable, One-Component, Electrically-Conductive, Flexible Epoxy Adhesives" and "Room-Temperature Stable, One-Component, Thermally-Conductive, Flexible Epoxy Adhesives".

TECHNICAL FIELD

The present invention relates generally to compositions used as adhesives. More particularly, the present invention relates to flexible epoxy compositions for use as adhesives, which are designed to be stable at room temperature.

BACKGROUND ART

The flexible polymer market offers a wide variety of adhesive polymers, including such compounds as polyurethanes, polysulfides, silicones, and epoxy compounds. In particular, epoxy compounds demonstrate the ability to strongly adhere to a variety of materials, including metal, glass, plastic, wood, and fiber, and consequently are often used to bond dissimilar materials. However, various disadvantages long associated with epoxy compounds have dampened industry enthusiasm for using epoxy compounds as adhesives in automated bonding processes.

One-component epoxy-based adhesives are available for industrial application in two basic forms: rigid epoxy adhesives and frozen pre-mix, flexible epoxy adhesives. Rigid epoxy adhesives include such compounds as Bisphenol-A epoxy adhesives and novolacs. These rigid epoxy adhesives exhibit strong adhesion for many materials and may be conveniently stored at room temperature. However, these adhesives form brittle bonds that are often insufficiently pliant for bonding dissimilar materials. For example, a brittle bond between dissimilar materials with different thermal expansion rates may be unable to withstand the stresses caused by the thermal mismatch, so that both the bond and its adherends may be susceptible to failure.

Frozen pre-mix, flexible epoxy adhesives are also employed by industry, although the usage of such adhesives is far surpassed by the usage of rigid epoxy adhesives. A description of frozen pre-mix, flexible epoxy adhesives is found in U.S. Pat. No. 4,866,108, assigned to the present assignee, which discloses and claims the composition behind Flexipoxy 100 Adhesive, a frozen flexible epoxy adhesive developed for spacecraft electronic applications. In comparison to rigid epoxy adhesives, flexible epoxy adhesives form more pliable bonds that are capable of successfully adapting to stresses between dissimilar materials caused by differing rates of expansion. However, in contrast to rigid epoxy adhesives, frozen pre-mix flexible epoxy adhesives must be stored in a frozen state and must be thawed prior to use. Moreover, frozen adhesives offer a limited working life of only about 2 to 8 hours once thawed, whereas at least one week of working life is realistically required for general automated bonding operations. Therefore, frozen pre-mix, flexible epoxy adhesives are widely considered impractical for use in high volume automated processing given the scheduling difficulties wrought by both the need to thaw the adhesives as well as the limited working life available after thawing.

Thus, a need remains for a one-component epoxy adhesive that offers the convenience of room temperature storage while also providing pliable bonds capable of withstanding the rigors of varying expansion rates between bonded materials. This need is particularly acute for high volume automated bonding operations, which can tolerate neither frequent periods of downtime for thawing nor the expense of discarding adhesives that quickly become ineffective. This need must be achieved without sacrificing good adhesion characteristics.

DISCLOSURE OF INVENTION

In accordance with the present invention, epoxy adhesive compositions are provided which are storable at room temperature, produce non-brittle, flexible bonds, exhibit strong adhesion, and have good processing characteristics. These compositions possess most, if not all, of the advantages of the above prior art compositions while overcoming their above-mentioned significant disadvantages.

The room-temperature stable, one-component, flexible epoxy-based adhesive compositions of the present invention comprise:

(a) at least one polyepoxide resin having a hardness not exceeding a durometer Shore D reading of 45 when cured with a stoichiometric amount of diethylene triamine ("DETA"); and (b) a substantially stoichiometric amount of at least one latent epoxy resin curing agent, wherein the cured combination of the polyepoxide resin and the latent curing agent exhibits a durometer Shore A of less than 95.

The polyepoxide resin component of the present compositions is a flexible epoxy resin. Flexible epoxy resins are defined herein to be those epoxy resins having a durometer Shore D measurement of 45 or less when cured with DETA. Polyepoxide resins suitably employed in the practice of the invention include, but are not limited to, diepoxide resins, triepoxide resins, and poly(oxypropylene)epoxide resins. Optionally, the epoxy resin component may also incorporate a semi-flexible resin such as the adduct of two moles of bisphenol A with one mole of the diglycidyl ester of linoleic dimer acid, the trifunctional novolac epoxy of cardanol, and the difunctional epoxy of cardanol. Semi-flexible epoxy resins are defined to be those epoxy resins having a durometer Shore-D value ranging from about 45 to 75 when cured with DETA. In comparison, rigid epoxy resins are defined as epoxy resins having a Shore-D value exceeding about 75 when cured with DETA.

The epoxy resin curing agent employed to cure the epoxy resin is a latent curative. As such, there is no reaction between the curing agent and the epoxy resin component at room temperature. Rather, the epoxy resin component is cured in the presence of the curing agent upon exposure to elevated temperatures. The present combination of epoxy resin and the latent epoxy resin curing agent remains uncured and Theologically stable at room temperature for months or even years, thus providing a long storage life conducive to automated bonding operations.

Aside from epoxy resin and latent curing agent components, other components that may be optionally added to the present adhesive compositions include fillers, thixotropic agents, and flexibilizers.

The present adhesive compositions are prepared by first mixing the following components to form a thoroughly wetted mass: (1) liquid components comprising the flexible polyepoxide component, and optionally, at least one component selected from the group consisting of flexibilizers and semi-flexible resins; and (2) solid components comprising at least one latent epoxy resin curing agent, and optionally, at least one component selected from the group consisting of fillers and thixotropic agents. The thoroughly wetted mass is then reacted at a temperature ranging from about 100° C. to 175° C. to form the present cured flexible epoxy adhesives, although the composition is designed to cure at a relatively low temperature ranging from about 100° C. to 125° C. in less than about two hours.

In sum, the adhesive of the present invention is novel in providing an epoxy-based adhesive composition that is storable for weeks as a single component mixture at room temperature, curable at relatively low temperatures in less than two hours, and flexible upon curing to temperatures as low as −50° C. Thus, the present adhesives offer the best features of the prior art adhesives. Like the frozen, pre-mix, flexible epoxy adhesives, the present adhesives form pliant bonds that withstand the stresses of thermal mismatch. Like the rigid epoxy adhesives, the present compositions may be conveniently stored at room temperature and easily processed. The ability of the present adhesives to provide strong flexible bonds without wreaking havoc on production schedules effectively promotes epoxy-based adhesives to use in automated bonding processes. In short, these adhesives enable industry to avail itself of the excellent adhesive qualities associated with epoxy compounds without sacrificing the advantages of automation. Importantly, the compositions of the present invention offer these benefits without employing solvent components, so that environmental integrity is maintained.

DETAILED DESCRIPTION OF THE PREFERRED EMBODIMENTS

The adhesive compositions of the present invention have been developed to provide industry with the ability to store epoxy-based adhesives at room temperature, as well as to provide good adhesion qualities, flexibility, and ease of processing.

The compositions of the present invention are based on the use of a combination of selected epoxy resins and a curing agent which will provide a flexible product that is storable at room temperature in an uncured state. The selection of the particular epoxy resins and the curing agent is critical in obtaining the desired flexibility in the final adhesive product.

The compositions of the present invention employ at least one polyepoxide resin falling within the class of so-called "flexible epoxy resins". The phrase "flexible epoxy resin" is intended to encompass epoxy resins having a durometer Shore D reading not exceeding 45 when cured with diethylene triamine ("DETA"). Flexible polyepoxide resins suitably employed in the practice of the invention include, but are not limited to, diepoxide resins, triepoxide resins, and poly(oxypropylene)epoxide resins. The internal flexibility exhibited by flexible polyepoxide resins derives from such features as long aliphatic chains, ether and ester linkages in the polymer chains, and double carbon-carbon bonds, which increase flexibility by enhancing the rotation of adjacent single carbon-carbon bonds.

Examples of polyepoxide resins suitably employed in the practice of the invention include such diepoxide resins as the following three compounds that are commercially available from Shell Chemical Co. of Houston, Tex.: (1) the diglycidyl ether of 1,4-butanediol, which has an epoxy equivalent weight of about 130 and is sold under the trade designation Heloxy 67, (2) the diglycidyl ether of neopentyl glycol, which has an epoxy equivalent weight of about 135 and is available under the trade designation Heloxy 68, and (3) the diglycidyl ether of cyclohexane dimethanol, which has an epoxy equivalent weight of about 160 and is sold under the trade designation Heloxy 107. Examples of poly(oxypropylene)epoxide resins suitably employed in the practice of the invention include the diglycidyl ether of polyoxypropylene glycol, which is commercially available from Dow Chemical, Midland, Mich., under the trade designations DER 732 and DER 736, having epoxy equivalent weights of about 320 and 190, respectively. Another suitable poly(oxypropylene)epoxide is the diepoxide of a polyoxypropylene diol, which has an epoxy equivalent weight ranging from about 290 to 325 and is commercially available from Shell Chemical Co. under the trade designation Heloxy 502. An example of suitably employed polyepoxide resin that is classified as both a poly(oxypropylene)epoxide resin and a triepoxide resin is 10 the polyglycidyl ether of an aliphatic polyol, which has an epoxy equivalent weight of about 650 and is commercially available from Shell Chemical Co. under the trade designation Heloxy 84.

It is important to note that not all so-called flexible polyepoxide resins are suitable for the practice of the invention. For instance, certain flexible epoxy resins fail to cure in a reasonable amount of time with available latent epoxy resin curatives. One example is the polyglycidyl ether of castor oil, which has an epoxy equivalent weight of about 600 and is commercially available from Shell Chemical Co. of Houston, Tex., under the trade designation Heloxy 505.

The compositions of the present invention may optionally employ so-called "semiflexible epoxy resins" as secondary resins. The phrase "semi-flexible epoxy resin" is intended to encompass epoxy resins having a durometer Shore D reading ranging from about 45 to 75 when cured with DETA. While semi-flexible resins are too rigid to serve as primary resins in the practice of the invention, these resins may be used to enhance certain properties of the adhesive composition, such as lap shear strength. While these secondary resins are useful as modifiers, they lack the flexibility or elongation necessary to serve as primary resins. More specifically, the addition of a semi-flexible epoxy resin to the present adhesive composition increases the composition's glass transition temperature $T_g$, which represents the temperature at the mid-point in the transition from glassy to rubbery behavior by a polymer. Since it is important that the present adhesive compositions have a glass transition temperature $T_g$ well below temperatures to which the present adhesive compositions may be exposed during their service life (including sub-zero conditions found outdoors), the concentration of semi-flexible resins in the present compositions must be limited. The maximum allowable concentration of semi-flexible resin will vary according to the composition of the adhesive as well as the lowest expected service temperature for the adhesive. However, as a general rule, the amount of semi-flexible epoxy resin present in the adhesive composition preferably does not exceed 40 wt % of the epoxy resin component.

Examples of semi-flexible resins suitably employed in the practice of the invention include the following compounds: (1) the adduct of two moles of bis-phenol A with one mole of linoleic dimer acid, which has an epoxy equivalent weight of about 700 and is commercially available from the Shell Chemical Company, Houston, Tex., under the trade designation EPON 872; (2) the trifunctional novolac epoxy of cardanol having an epoxy equivalent weight of about 600, as available from the Cardolite Corp., Newark, N.J., under the trade designation NC-547; and (3) the difunctional epoxy of cardonal having an epoxy equivalent weight of about 350, as available from Cardolite Corp. under the trade designation NC-514.

The curing agents used in the present compositions are chosen to provide a flexible product from the selected epoxy resins. The present curing agents are characterized by long aliphatic moieties in their structure which allow compatibility with the selected resins at cure temperature. The present curing agents are further characterized as "latent" curatives. A latent curative is one that does not operate to cure an epoxy resin until melted in the elevated temperatures of a curing process while in contact with the targeted epoxy resin.

Examples of curing agents that may be suitably employed in the practice of the invention to achieve flexible epoxy adhesives (in view of the selected classes of epoxy resins, the selected cure temperature range of about 100° C. to 125° C., and the selected cure time of less than two hours) include dihydrazide curing agents, although the choice of curing agent is not so limited. Examples of dihydrazide curing agents suitably employed in the practice of the invention include the following compounds available from Ajinomoto Co., Inc., of Teaneck, N.J.:

(1) aliphatic dihydrazide with Diuron accelerator (3-(3,4-dichlorophenyl)-1,1-dimethyl urea), having an active hydrogen equivalent weight of 134 as available under the trade designations Ajicure AH-122 and Ajicure AH-123;

(2) adipic acid dihydrazide with Diuron accelerator (3-(3,4-dichlorophenyl)-1,1-dimethyl urea), having an active hydrogen equivalent weight of 49 as available under the trade designation Ajicure AH-127;

(3) icosanedioic acid dihydrizide ($C_{20}H_{42}N_4O_2$), having an active hydrogen equivalent weight of 92.5 as available under the trade designation LDH, with about 10% of the compound as sold being hexadecanedioic acid dihydrazide according to the Ajinomoto material safety data sheet ("MSDS");

(4) 7,11-octadecadiene-1,18-dicarboxylic acid dihydrazide ($C_{20}H_{38}N_4O_2$), having an active hydrogen equivalent weight of 91.5 as available under the trade designation UDH; and (5) Valine dihydrazide, having an active hydrogen equivalent weight of 78.5 as available under the trade designation of VDH.

Preferably, AH-122, AH-123, and AH-127 are employed in the practice of the present invention.

Certain curing agents are known to fail in meeting one or more of the objectives of the present invention. For example, the polyarine adduct of epoxy resin, commercially available from Air Products, Allentown, Pa., under the trade designation Ancanine 2014, displays poor compatibility with flexible epoxy resins and results in unacceptably long cure times. Likewise, epoxy-amnine adducts, such as commercially available from Ajinomoto Co., Inc. under the trade designations Ajicure PN-23 and Ajicure MY-24, prove incompatible with flexible epoxy resins.

The amount of latent curing agent is preferably in stoichiometric proportion relative to the epoxy resin employed. In general, the amount of curing agent may be varied about ±15 percent from stoichiometry, with little adverse effect on the final product. The severity of adverse affects deriving from employing more or less than the exact stoichiometric amount of curing agent depends upon the fuinctionality of the ingredients employed (e.g., trifunctional epoxy resins fare better than difunctional epoxy resins) and the cure temperatures employed (e.g., resins cured at higher temperatures fare better than those cured at lower temperatures).

One novel feature of the invention is that the uncured combination of epoxy resins and a latent curing agent is stable at room temperature. More specifically, the uncured combination is rheologically stable at room temperature so that it does not cure at room temperature and is stable in terms of viscosity. Thus, unlike frozen, pre-mix flexible epoxy compounds, the present compositions may be cured relatively quickly (less than two hours) on an as-needed basis. Upon cure, the present compositions remain flexible and reworkable, with a Durometer Shore A of less than 95. Another novel feature of the present composition is that its flexibility extends to as low as minus 50° C. (−50° C.), as measured by glass transition temperature $T_g$. This compares to typical glass transition temperatures in excess of +100° C. for rigid epoxy adhesives.

Optionally, the composition of the present invention may include reactive or nonreactive flexibilizers, preferably not exceeding 50 wt % of the total liquids in the adhesive, which include the epoxy resins and the flexibilizers. Both reactive and non-reactive flexibilizers serve to enhance the flexibility and reworkability of the final adhesive composition, albeit by different mechanisms. Reactive flexibilizers act as internal plasticizers, typically taking the form of long aliphatic chains which are pendant to the main polymer network. Reactive flexibilizers include rubbery polymers which have a suitable reactive group. Examples of such flexibilizers include polysulfides (such as Thiokol LP3, which is a liquid polysulfide reactant available from Morton Chemical of Chicago, Ill.), polyamides, and carboxyl-terminated butadiene rubbers.

On the other hand, non-reactive flexibilizers act as external plasticizers which do not chemically attach to the polymer network but are retained in the network due to van der Waals attraction and/or hydrogen bonding. Consequently, they must have a chemical structure compatible with the epoxy/curative structure in order not to be expelled. Plasticizers with high molecular weight are desirable, since the increased chain entanglement between plasticizer and the epoxy/curative structure serves to decrease migration of the plasticizer. Simple experimentation to determine compatible plasticizers, such as by preparing a polymer and proposed plasticizer and observing whether compatibility exists, may be done. Such experimentation is considered to be a routine endeavor that is well within the capabilities of those having ordinary skill in the art and is not considered to be undue.

Polyols having molecular weights of at least 1,000 and triols with molecular weights ranging from 1,500 to 6,000 are commonly employed as non-reactive plasticizers. Examples of high molecular weight triols suitably employed in the practice of the invention are high molecular weight poly(oxypropylene)triol (available from Union Carbide, Danbury, Conn., under the trade designation LHT-28) and hydroxyl-termiinated polybutadiene (available from Atochem, under the trade designation Poly BD R45HT). Other examples of suitable non-reactive flexibilizers include phthalate esters, adipate esters, and methyl lineolate.

The adhesive composition may also optionally include a thixotropic agent. Thixotropic agents are used to prevent settling of the curative, which is in powder form and is prone to separating from the liquid epoxy resin during cure. More specifically, thixotropic agents retard settling of the curative by increasing the low shear viscosity of the liquid. The thixotropic agent may comprise any of the well-known materials for this purpose, such as fine particle fillers like clays, talc and, preferably, fumed silica. The amount of thixotropic agent is that amount which is effective in producing the desired thixotropic properties of the final product, i.e., that amount which prevents the paste or film from flowing under its own weight. Simple experimentation will readily determine the appropriate amount of thixotropic agent in the adhesive composition. The scope of experimentation required to determine the proper concentration of thixotropic agent is considered to be reasonable for those having ordinary skill in the art and is not considered to be undue. As a general rule, it is preferred in the practice of the invention that the thixotropic agent be limited to 5 wt % of the total liquids in the adhesive composition, with a concentration ranging from about 1 to 5 wt % of the total liquids being more preferred. It is noted that the components making up the total liquids in the adhesive composition include the epoxy resins and any flexibilizers. The preferred particle size for a thixotropic agent in the practice of the invention ranges from about 0.01 to 0.1 μm.

Other optional additives to the flexible epoxy adhesive composition include fillers, UV stabilizers, antioxidants, and processing aids. If employed, the amount of filler should be adjusted to impart a smooth paste-like consistency to the liquid adhesive, keeping in mind that the filler preferably does not exceed 60% by volume of the total liquids in the adhesive, which include the epoxy resins and any flexibilizers. More preferably, the filler does not exceed 50% by volume of the total liquids in the adhesive. Further, the particle size of the filler material should be considered in formulating the adhesive composition, since the filler and curative particulate materials likely compete for space within the adhesive cornposition. This potential overcrowding problem can be overcome by selecting different particle sizes for curative and filler such that the smaller particle fits into the interstices between the larger particles. At any rate, the adhesive composition is best served if the filler material is fine and measures less than 44 μm in diameter, which correlates to the standard 325-mesh sieve size.

Processing aids that may be employed in the practice of the invention include wetting agents, anti-foaming agents, and dispersing agents, all of which are known and commonly used in the art. The processing aids are preferably employed at a concentration of up. to 5 wt % of the total adhesive composition.

The adhesive of the present invention is formulated by mixing the liquid components (namely, the epoxy resins and flexibilizers) with the dry ingredients (namely, the curing agents, thixotropic agents, and fillers) in their appropriate concentrations until the dry ingredients are thoroughly wetted. Preferably, the dry ingredients are milled into the liquid ingredients, for example, using a 3-roll mill. Milling achieves a good blend of resin and curative so that the resulting adhesive is uniform in composition and therefore exhibits higher overall quality. Once the dry ingredients are thoroughly wetted, air is removed from the adhesive mixture by further mixing it under vacuum. The resulting uncured composition may be stored at room temperature for several weeks. Further, storage for extended periods of time may be done at temperatures not exceeding 35° C.

When the mixture comprising the present composition is to be used as an adhesive, the mixture must be cured. First, the mixture is placed in contact with the materials to be bonded in the manner desired for adhesion. Then, the mixture is cured by heating both the materials to be bonded and the inserted mixture to an elevated cure temperature. While a cure temperature as high as 175° C. may be employed depending upon the particular electronics application, the present adhesive compositions are designed to cure in less than about 2 hours at a temperature ranging from about 100° C. to 125° C. The minimum curing temperature varies by formulation, but below 70° C., the mixture will not properly cure. While cure times vary with the melting point and molecular weight of the curing agent, the cure time for the adhesives of the present invention does not exceed about 2 hours. It is contemplated that in most cases the cure time need only be approximately 30 minutes. Upon cure, the present adhesive composition forms a strong, flexible bond between the materials that remains flexible down to a glass transition temperature $T_g$ as low as −50° C., with the precise minimum $T_g$ depending on the formulation of the adhesive.

EXAMPLES

Compositions in accordance with the present invention were prepared as described in Examples 1–5 below. For comparison, Examples 6–8 contain examples of compositions outside the scope of the present invention. Shore-A Durometer tests were performed on the viable adhesive compositions as specified by the American Society for Test and Materials ("ASTM") in the standard "Indentation Hardness of Rubber and Plastics by Means of a Durometer" (ASTM D2240). A Durometer Shore A reading of less than 95 indicates that the material is flexible. Tests for ultimate tensile elongation and lap shear strength were performed as specified by ASTM D412 and ASTM D002, respectively.

Specimens of Examples 1–5 were prepared by first mixing the epoxy resins and curing agents, casting, and then curing the mixtures from 30 to 120 minutes at 120° C. These results are summarized in Table I below, which lists three basic measurements regarding each formulation tested, namely Durometer readings, ultimate tensile elongation, and lap shear strength of the adhesive bond. Formulations 1–5 are described in Examples 1–5, respectively, with the amount of epoxy resin employed for each formulation subject to a variation from the reported amount by ±5 percent. All of these formulations had good processing characteristics.

Specimens of Examples 6–8 were prepared by mixing the epoxy resins and curing agents, casting, and then curing the mixtures, with the results of curing reported in Table II, below. Formulations 6–8 are described in Examples 6–8, respectively. Each of these formulations failed to meet one or more requirements of the present invention, as described in greater detail below.

TABLE I

TEST RESULTS WITHIN SCOPE OF INVENTION

| Formulation[1] | Durometer Shore A | Ultimate Tensile Elongation, % | Lap Shear Strength (Alum/Alum), psi (kg/cm²) |
|---|---|---|---|
| 1 | 88 | 110 | 870 (61.2) |
| 2 | 45 | 90 | 120 (8.43) |
| 3 | 42 | 105 | 385 (27.1) |
| 4 | 36 | 110 | 190 (13.4) |
| 5 | 15 | 250 | 40 (2.81) |

[1]For composition of Formulations 1–5, see respectively Examples 1–5.

TABLE II

TEST RESULTS OUTSIDE SCOPE OF INVENTION

| Formulation[2] | Composition | Result of Curing Process |
|---|---|---|
| 6 | EPON 828<br>AH-122 | Cured at 100° C.<br>Rigid adhesive (80D) |
| 7 | EPON 871<br>AH-122 | Cured at 120° C.<br>Slow cure |
| 8 | Heloxy 67<br>Ancamine 2014FG | Curative separated out |

[2]For composition of Formulations 6–8, see respectively Examples 6–8.

Examples of compositions useful in the practice of the present invention are as follows:

Example 1

A preferred composition in accordance with the present invention and corresponding to Formulation 1 in Table I was formulated as follows:

| Material | Parts by Weight |
|---|---|
| Heloxy 67 (epoxy) | 100 |
| Ajicure AH-122 (curative) | 100 |

Heloxy 67 is a low molecular weight diepoxide resin, having an epoxy equivalent weight of about 130. The flexibility of the Heloxy 67 resin derives from its tetramethylene moiety and ether groups. Ajicure AH-122 is a dihydrazide epoxy curative having an active hydrogen equivalent of 134. Upon cure, this formulation provided a flexible epoxy adhesive with a Durometer Shore A of 88, which meets the requirement of a Durometer Shore A reading of less than 90.

Example 2

A composition in accordance with an alternative embodiment of the present invention and corresponding to Formulation 2 in Table I was formulated as follows:

| Material | Parts by Weight |
|---|---|
| Heloxy 67 (epoxy) | 50 |
| Heloxy 84 (epoxy) | 50 |
| Ajicure AH-122 (curative) | 60 |

Heloxy 67 is a low molecular weight diepoxide resin, having an epoxy equivalent weight of about 130. Heloxy 84 is a poly(oxypropylene)epoxide resin having an epoxy equivalent weight of about 650. Ajicure AH-122 is a dihydrazide epoxy curative having an active hydrogen equivalent of 134. This formulation illustrates that low molecular weight diepoxides resins and poly(oxypropylene)epoxide resins may be combined in the formulation of a flexible epoxy compound. The resulting Durometer Shore A reading for this formulation was 45, which indicates that the addition of Heloxy 84 to the formulation increased the flexibility over that for Heloxy 67 alone as in Example 1. However, the lap shear strength and elongation of this formulation decreased from Example 1. The decrease in elongation is attributable to the highly cross-linked structure of Heloxy 84, a feature typical of such triepoxides. In sum, a comparison of Examples 1 and 2 demonstrates that formulations of the invention may be tailored to provide specific physical properties.

Example 3

A composition in accordance with another alternative embodiment of the present invention and corresponding to Formulation 3 of Table I was formulated as follows:

| Material | Parts by Weight |
|---|---|
| Heloxy 67 (epoxy) | 50 |
| DER 736 (epoxy) | 50 |
| Ajicure AH-122 (curative) | 85 |

Heloxy 67 is a low molecular weight diepoxide resin, having an epoxy equivalent weight of about 130. DER 736 is a poly(oxypropylene)epoxide resin having an epoxy equivalent weight of about 320. Ajicure AH-122 is a dihydrazide epoxy curative having an active hydrogen equivalent of 134. Like Example 2, this formulation illustrates that low molecular weight diepoxides resins and poly(oxypropylene) epoxide resins may be combined in the formulation of a flexible epoxy resin. The resulting Durometer Shore A reading for this formulation was 42, which indicates that the addition of DER 736 to the formulation increased the flexibility over that for Heloxy 67 alone as in Example 1. Further, the addition of DER 736 rather than Heloxy 84 in Example 2 dampened the drop in elongation and lap shear strength observed in that example, which is an expected outcome given the lesser degree of cross-linking of DER 736 compared to Heloxy 84 in the previous example. Again, this example demonstrates the tailoring that can be accomplished using the various embodiments of the invention.

Example 4

A composition in accordance with another alternative embodiment of the present invention and corresponding to Formulation 4 of Table I was formulated as follows:

| Material | Parts by Weight |
|---|---|
| DER 736 (epoxy) | 100 |
| Ajicure AH-122 (curative) | 71 |

DER 736 is a poly(oxypropylene)epoxide resin having an epoxy equivalent weight of about 320. Ajicure AH-122 is a dihydrazide epoxy curative having an active hydrogen equivalent of 134. This formulation illustrates that poly (oxypropylene)epoxide resins may be successfully used alone in the practice of the invention. The resulting Durometer Shore A reading for this formulation was 36.

Example 5

A composition in accordance with another alternative embodiment of the present invention and corresponding to Formulation 5 of Table I was formulated as follows:

| Material | Parts by Weight |
| --- | --- |
| DER 732 (epoxy) | 100 |
| Ajicure AH-122 (curative) | 42 |

DER 732 is a poly(oxypropylene)epoxide resin having an epoxy equivalent weight of about 190. Ajicure AH-122 is a dihydrazide epoxy curative having an active hydrogen equivalent of 134. Like formulation 4, this formulation illustrates that poly(oxypropylene)epoxide resins may be successfully used alone in the practice of the invention.

The resulting Durometer Shore A reading for this formulation was only 15, and the lap shear strength for this formulation dropped to 40 psi compared to Example 4. Thus, solely using DER 732, which offers only 60% of the epoxy equivalent weight of DER 736 from Example 4, results in a highly flexible adhesive with minimal lap shear strength. Low lap shear strength is a desirable quality for reworkable adhesives; for example, an electronic component adhered with a reworkable adhesive can be removed without damaging the component or the PWB.

Examples outside the scope of the present invention are as follows:

Example 6

The following composition, corresponding to Formulation 6 of Table II, lies outside the scope of the present invention by employing a rigid epoxy resin:

| Material | Parts by Weight |
| --- | --- |
| EPON 828 (epoxy) | 100 |
| Ajicure AH-122 (curative) | 71 |

Epon 828 is a diglycidyl ether of Bisphenol A with an epoxy equivalent weight of about 185 to 192, which is commercially available from Shell Chemical Company, Houston, Tex. Ajicure AH-122 is a dihydrazide epoxy curative having an active hydrogen equivalent of 134. Formulation 6 had a Durometer Shore D of 80, which is typical of a very hard plastic. Further, since a Shore D of 45 is about 90 on the Shore A scale, a Shore D of 80 equates to a Durometer Shore A much higher than 95. Thus, this formulation illustrates the inability of the rigid resin Epon 828 to serve as the primary resin component in producing a room-temperature stable, flexible epoxy adhesive, although having been cured with the epoxy curative Ajicure AH-122.

Example 7

The following composition, corresponding to Formulation 7 of Table II, lies outside the scope of the present invention:

| Material | Parts by Weight |
| --- | --- |
| EPON 871 (epoxy) | 100 |
| Ajicure AH-122 (curative) | 31 |

Epon 871 is an aliphatic polyepoxide (specifically, diglycidyl ester of linoleic dimer acid) having an epoxy equivalent weight of about 430, which is commercially available from Shell Chemical Company. Ajicure AH-122 is a dihydrazide epoxy curative having an active hydrogen equivalent of 134. Formulation 7 cured at an unacceptably slow rate, for a total of more than two hours. Further, the resin and curative were not readily soluble at the cure temperature. Thus, this formulation illustrates that Epon 871 does not meet the requirements of the invention.

Example 8

The following composition, corresponding to Formulation 8 of Table II, lies outside the scope of the present invention by employing a latent curing agent that is incompatible with the epoxy resin:

| Material | Parts by Weight |
| --- | --- |
| Heloxy 67 (epoxy) | 100 |
| Ancamine 2014FG (curative) | 38.5 |

Heloxy 67 is a low molecular weight diepoxide resin, having an epoxy equivalent weight of about 130. Ancamine 2014FG is a modified polyamine curing agent available from Air Products with an equivalent hydrogen weight of 52. This formulation failed to cure properly, resulting in an agglomeration in which the curative separated out of the composition. Thus, this formulation illustrates that Ancamine 2014FG, a non-dihydrazide curing agent, is not suitably employed as a curative for Heloxy 67 in the practice of the invention. More generally, this formulation shows that the choice of latent curative to be combined with a flexible epoxy resin to produce a flexible epoxy adhesive is crucial in avoiding problems of incompatibility and separation of ingredients.

INDUSTRIAL APPLICABILITY

The cured adhesives of the invention are flexible across wide ranges of temperatures and are capable of effectively bonding dissimilar materials experiencing thermal mismatch. Further, the uncured adhesives of the invention are Theologically stable at room temperature for time periods measured in excess of three months. Given these qualities, the adhesives of the invention may be successfully employed in numerous industrial applications requiring automated bonding of dissimilar materials, including the manufacture of such products as automobiles, motorhomes, aircraft, boats, and manufactured homes.

Thus, there has been disclosed a composition and a method for making a flexible epoxy adhesive that is storable in its uncured state at room temperature. It will be readily apparent to those of ordinary skill in this art that various changes and modifications of an obvious nature may be made, and all such changes and modifications are considered to fall within the scope of the invention, as defined by the appended claims.

What is claimed is:

1. A flexible epoxy adhesive consisting of a combination of the following components:

(a) at least one epoxide resin having a hardness not exceeding a durometer Shore D reading of 45 when cured with a stoichiometric amount of diethylene triamine, said epoxide resin being selected from the group consisting of the diglycidyl ether of 4,4-butanediol, the diglycidyl ether of neopentyl glycol, the diglycidyl ether of cyclohexane dimethanol, the diglycidyl ether of polyoxypropylene glycol, and the polyglycidyl ether of an aliphatic polyol; and (b) about 42–100 parts by weight of at least one latent epoxy resin curing agent per 100 parts by weight of resin, said latent epoxy resin curing agent comprising a dihydrazide compound, wherein said combination is rheologically stable at room temperature, cures at about 100–125° C., and has a durometer Shore A of less than 95 upon cure to provide a flexible and reworkable epoxy bond.

2. The flexible epoxy adhesive of claim 1 wherein said latent epoxy resin curing agent is selected from the group consisting of aliphatic dihydrazide, adipic acid dihydrazide, icosanedioic acid dihydrazide, 7,11-octadecadiene-1,18-dicarboxylic acid dihydrazide, and valine dihydrazide, said aliphatic dihydrizide and said adipic acid dihydrazide further comprising an accelerator having the formula 3-(3,4-dichlorophenyl)-1,1-dimethyl urea.

* * * * *